(12) United States Patent
Angenica

(10) Patent No.: US 10,628,799 B2
(45) Date of Patent: Apr. 21, 2020

(54) EMPLOYEE TIME TRACKING SYSTEM

(71) Applicant: Mario Angenica, Plymouth, MA (US)

(72) Inventor: Mario Angenica, Plymouth, MA (US)

(*) Notice: Subject to any disclaimer, the term of this patent is extended or adjusted under 35 U.S.C. 154(b) by 242 days.

(21) Appl. No.: 15/899,818

(22) Filed: Feb. 20, 2018

(65) Prior Publication Data
US 2019/0259003 A1 Aug. 22, 2019

(51) Int. Cl.
*G06Q 10/10* (2012.01)
*H04L 29/08* (2006.01)

(52) U.S. Cl.
CPC ......... *G06Q 10/1091* (2013.01); *H04L 67/10* (2013.01)

(58) Field of Classification Search
CPC .................. G06Q 10/1091; G06Q 40/125
See application file for complete search history.

(56) References Cited

U.S. PATENT DOCUMENTS

| | | | | |
|---|---|---|---|---|
| 2008/0296364 A1* | 12/2008 | Pappas | ............... | G06Q 10/06 235/377 |
| 2012/0233044 A1* | 9/2012 | Burger | ............... | G06Q 10/06 705/32 |
| 2013/0268418 A1* | 10/2013 | Sardi | ............... | G06Q 10/1091 705/32 |
| 2014/0207635 A1* | 7/2014 | Pappas | ............... | G06Q 10/109 705/32 |
| 2016/0337136 A1* | 11/2016 | Bester | ............... | H04L 9/3297 |

* cited by examiner

*Primary Examiner* — A. Hunter Wilder
(74) *Attorney, Agent, or Firm* — Lambert Shortell & Connaughton; Gary E. Lambert; David J. Connaughton, Jr.

(57) ABSTRACT

A computerized hours tracking device and system is provided. The system provides a mobile, computerized solution to tracking hours of a worker. Further, the system includes functions to ensure that proper hours tracking is performed, such as identification confirmation and/or location tracking. As configured, the device and system allow for more reliable tracking of hours worked by a worker.

12 Claims, 4 Drawing Sheets

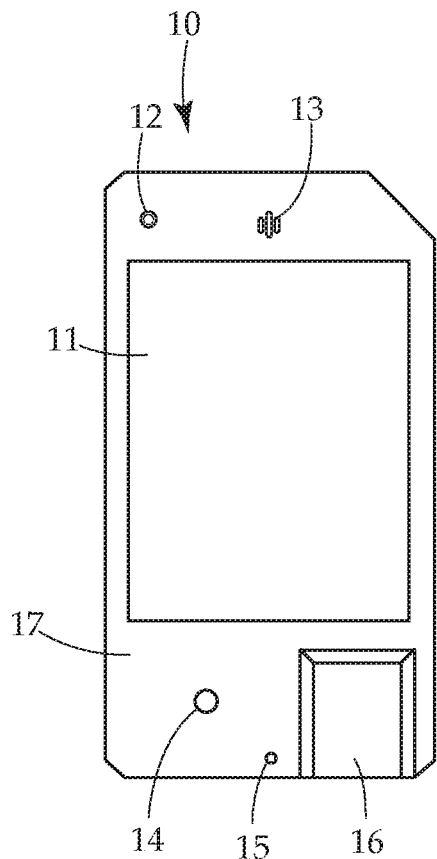
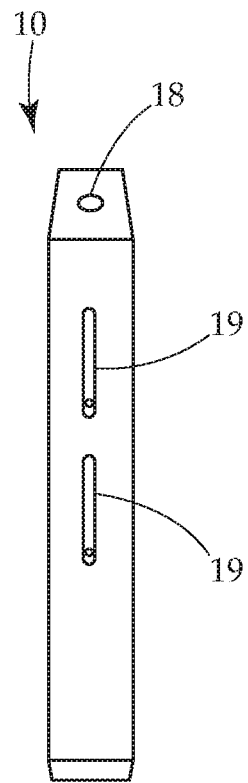
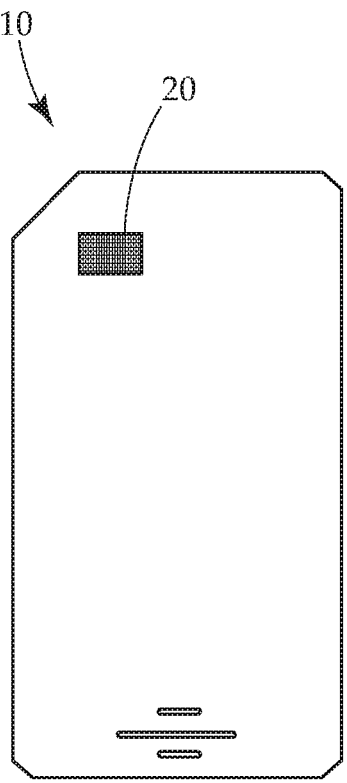
*Fig. 1A*    *Fig. 1B*    *Fig. 1C*
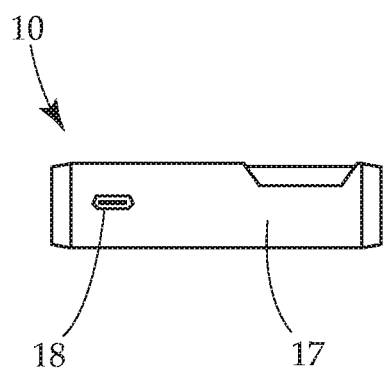
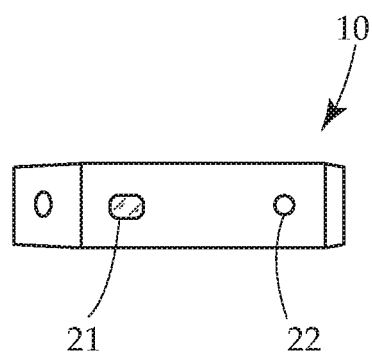
*Fig. 1D*    *Fig. 1E*

EMPLOYEE TIME TRACKING SYSTEM

BACKGROUND OF THE INVENTION

Field of the Invention

The present invention relates generally to a device and/or system to calculate hours worked. More particularly the present invention relates to a system and device that intelligently tracks hours worked and other metrics of a worker.

Description of Related Art

For businesses that rely on workers who track their time, a major challenge is difficulty in tracking actual hours worked by the workers. Businesses have been using the "time clock" method to calculate the hours of the employee. An example of time clock use involves a user inputting a number that has been given to identify him or her when the work starts ("punching in"). When finishing a shift, the worker "punches out" in the same or similar way. At the end of the week the worker's hours are calculated and a payment is made. Sometimes the time clock is a physical device, other times it is computerized. In many cases, the calculated hours may not line up with the time actually worked by the worker.

For example, employees may take extended lunch breaks without permission, run personal errands during work time, may spend excessive time on the phone, and the like. This leads to unfinished work, lack of attention to detail, along with workers being paid for when they are not working. In some extreme cases, employees may say they are at work when they are not. These inefficiencies in time tracking leads to workers being paid more or less than they deserve.

Also, sometimes the time clocks are not portable, and there is no actual control if the person using the time clock is the person getting credit for the time worked. There is no full control over the employee because he or she can clock in and out when they want. In one example, a worker may clock in, but leave the work area and come back to clock out, or have a co-worker do that task for them. For businesses that use time clocks on a phone or portable system, employees have been seen to be very comfortable not having an employer watching them, resulting in not checking out for lunch breaks, leaving work before the shift ends, and leaving the job undone.

Therefore, what is needed is a device and system that may more accurately and reliably track the hours worked by a worker.

SUMMARY OF THE INVENTION

The subject matter of this application may involve, in some cases, interrelated products, alternative solutions to a particular problem, and/or a plurality of different uses of a single system or article.

In one aspect, a system for tracking hours of a worker is provided. The system uses a computerized hours-tracking device which comprises a processor, a memory, a location module configured to determine a coordinates of a physical location of the device, a touch screen display, and a battery providing power to the device. The system further has a computerized server in wireless communication with the computerized hours-tracking device. The communication between the computerized server and computerized hours-tracking device involves a recordation of the determined location of the device by the computerized server. Further, communication between the two may allow the server to record a start time input from the computerized hours-tracking device, and an end time input from the computerized hours-tracking device. Based on the recorded start time and end time, at least one of the device and the server is configured to calculate a work time based on a time period between the start time and end time inputs. Further, based on the recorded location of the device, the server is configured to record when the computerized hours-tracking device moves outside of a predetermined boundary around a worksite, allowing the server to determine if a worker has left the work site.

In another aspect, an hours-tracking device for a worker is provided. The device has a processor, a memory, a touch screen display, and a battery. Further the device has a location module configured to determine a coordinates of a physical location of the computerized hours-tracking device. The touch screen display is configured to receive a start time input and an end time input, and configured to record the coordinates of the location module at the start time input and at the end time input.

BRIEF DESCRIPTION OF THE DRAWINGS

FIG. 1A provides a front view of an embodiment of the device contemplated herein.

FIG. 1B provides a side view of an embodiment of the device contemplated herein.

FIG. 1C provides a rear view of an embodiment of the device contemplated herein.

FIG. 1D provides a bottom view of an embodiment of the device contemplated herein.

FIG. 1E provides a top view of an embodiment of the device contemplated herein.

DETAILED DESCRIPTION

Figure 2:
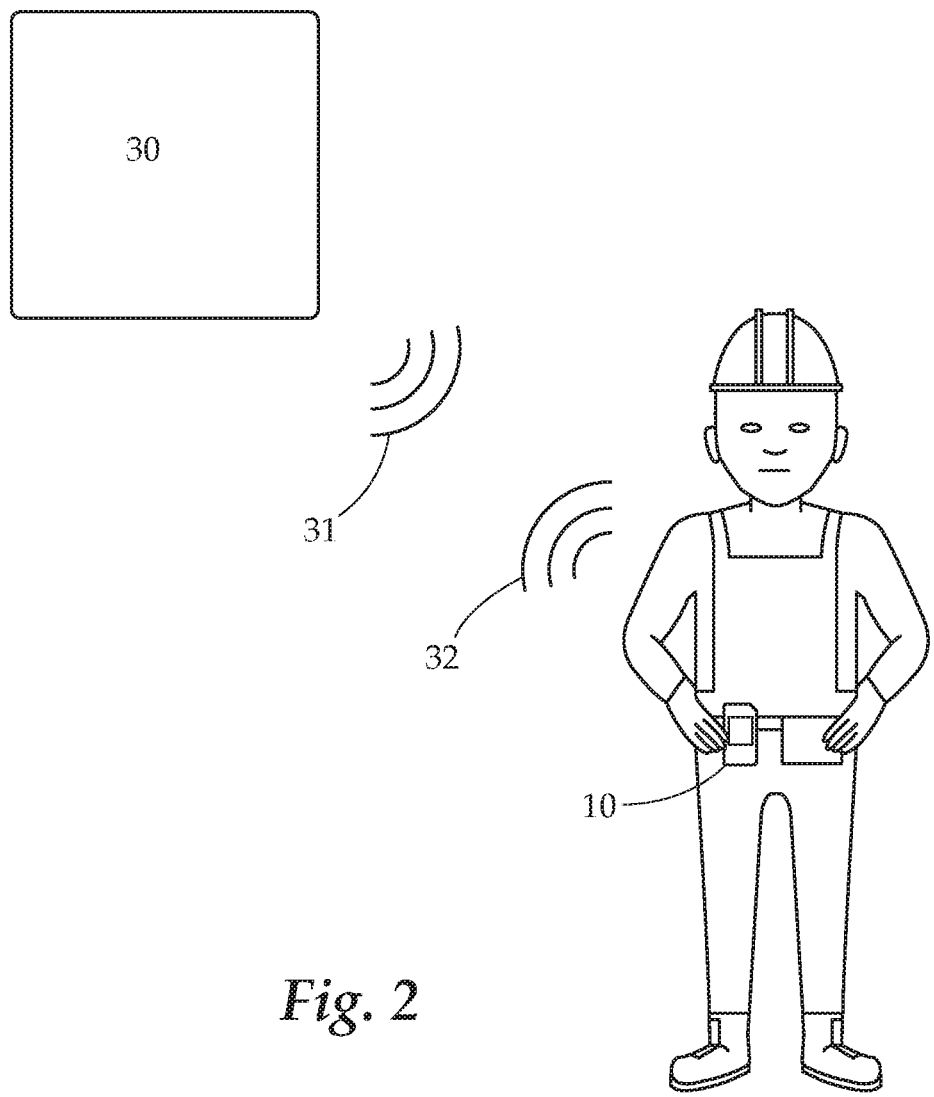
FIG. 2 provides a view of an embodiment of the present disclosure in use.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a system and device for tracking employee hours and activities. The system includes a server in communication with a mobile computerized hours-tracking device which, among other features, allows for an employee to clock in and clock out to track time. At the same time, a GPS or other location tracking system of the device conveys location data to the server, allowing location and movement tracking of the employee.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed invention may be practiced. It is to be understood, however, that those skilled in the art may develop other structural and functional modifications without departing from the novelty and scope of the instant disclosure.

In one embodiment, the hours-tracking device of the present disclosure may have, among other features, a processor, memory, location module such as, but not limited to, a GPS module, a touch screen display, and a battery or other mobile power source. The hours-tracking device, in most embodiments, is configured to receive a start time input and an end time input for an employee user. Based on the input start time and end time, the hours-tracking device is configured to calculate a work time. In many embodiments, upon input of the start time, a timer may begin, which is stopped by the end time input. The device, as configured, may be a specialized mobile computing device, or may be an existing computerized device such as a smartphone programmed to carry out the functions and/or steps of the hours-tracking device. In a particular embodiment of operation, when a telephone operation is in process, the device may automatically stop the time tracker, restarting it once the call ends. A similar operation may be performed if a web browser or other non-work related app or function is being used by the device.

In one embodiment, the hours-tracking device has a location module. Generally the location module operates to determine a location of the hours-tracking device. Typically, this location module is in the form of a GPS system. However, in other embodiments, the location module may use other networked systems such as cellular, to determine a location and/or a proximity to a particular location, and/or if the hours-tracking device is within a programmed zone, such as an area around a work site.

The computerized hours-tracking device may also have one or a plurality of additional features to improve the operability, functionality, and/or desirability of the device and system. For example, the hours-tracking device may have one or more identification systems, including, but not limited to a fingerprint scanner, a facial identification system, an iris scanner, a pin code input, and the like. The identification system may be utilized both when the user inputs the start time and the end time to ensure that it is indeed the user who is clocking in and out.

The hours-tracking device, in one embodiment, may have an accelerometer or similar motion sensor. The motion sensor may be configured to identify movement of the device. In typical embodiments when the device is in a user's pocket, belt clip, or otherwise on the user's person, the motion sensor is usable to track motion of the user. This information may be useful to determine if a user is actively working, has left a work area, or is has been involved in an accident (if movement has not occurred in a predetermined amount of time, and/or if movement was very rapid or abrupt such as a fall).

The hours-tracking device may also have one or more of an AM/FM radio, MP3 player, Bluetooth®, capability, Wi-Fi, Weather information and notifications, emergency call options, employer direct call options, SMS or other messaging, cellular communications function, and the like. In further embodiments, the hours-tracking device may have a detector configured to measure air quality, which may, among other measurements, measure one of carbon monoxide, ethane, isoprene, ethanol, acetone, and the like. In still further embodiments, the hours-tracking device may have a biometric sensor, such as a pulse oximeter, heart rate sensor, and the like.

The server of the present system is used to communicate with the hours-tracking device and to track and record data received from it. In most embodiments, the server is configured to record the start and end time input. Depending on configuration, the server may calculate the time worked based on these inputs, or the hours-tracking device may calculate the time worked and send it to the server, or both. The server may record these inputs over time and store them in a memory. The calculated work time is input into a pay rate calculation to determine the payment amount due to the worker.

In a further embodiment, the server may be configured to receive an input from the hours-tracking device periodically regarding location of the hours-tracking device from the location module. In some embodiments, the server may be configured to automatically identify when a device moves outside of a predetermined boundary around a worksite. In other embodiments, the device may do this, and send the information to the server. The boundary of the worksite may be programmed into the server or hours-tracking device, or both. In one embodiment, the hours-tracking device may send a notification to the server when the device leaves the worksite area. In another embodiment, the server may determine that the hours-tracking device is outside of the work area based on the input from the location module. In some embodiments, the device or server may be configured to automatically subtract an amount of time that the hours-tracking device is outside of the boundary of the work area from the calculated work time. It should be understood that different functionalities of the server and computerized hours-tracking device may be performed by each other. Variation of functionality between the server and device are may be interchanged without straying from the scope of the present disclosure.

Turning now to FIGS. 1A-E, views of an embodiment of the computerized hours tracking device are provided. The computerized hours tracking device 10 has a body 17 which forms the structure of the device 10. A touch screen is present on the front of the device 10 operating both as a display and an input for a user. A speaker 13 and microphone 15 are available to allow for audio output and input. Identity confirming elements may be included such as shown in these figures such as a fingerprint scanner 16. A joystick 14 allows for an additional input source to the device 10, for example in non-touch screen embodiments, if the touch screen is non-operational, or if a user is wearing gloves that do not work with a touch screen. A camera 12 allows the device to take and store photographs and may have identity confirmation elements such as iris/face scanning. A side of the device 10 includes removable memory storage 19 such as a SIM or SD/micro SD card. A light 18 on the upper surface, or upper angled surface, of the device allows an output indication to the user when the device is in a belt loop or pocket, providing convenient notifications, among other uses. A speaker 20 is positioned on a rear of the device which can provide audio output. A USB or other input/output cord connection 18 is positioned on the device bottom to allow for charging and/or data connection. A light, such as a flashlight or indicator light 21 is positioned on a top of the device, as is a headphone jack 22. It should be understood that while the various components are on particular sides of the device 10, these may be moved to different sides and faces without straying from the scope of the disclosure. Various embodiments may include or exclude these elements in varied combinations depending on configuration of the device. For example, in a similar embodiment, the device 10 may be a smartphone comprising programming configured to provide the required operation of the present disclosure.

FIG. 2 shows an embodiment of the operation of the present invention. Here, a worker has the computerized hours tracking device 10 on his person, particularly on his belt holster. The device 10 is in wireless communication with a server 30. Typically this is wireless communication by a cellular or Wi-Fi connection or similar, but any electronic communication may suffice. The communication between device 10 and server 30 is discussed above, and provides for aspects of the tracking functionality of the present disclosure. Communication is shown here as two way communication from the server to the device 31 and from the device to the server 32. In another embodiment, the communication may simply be from the device 10 to the server 30, without return communication.

Figure 3:
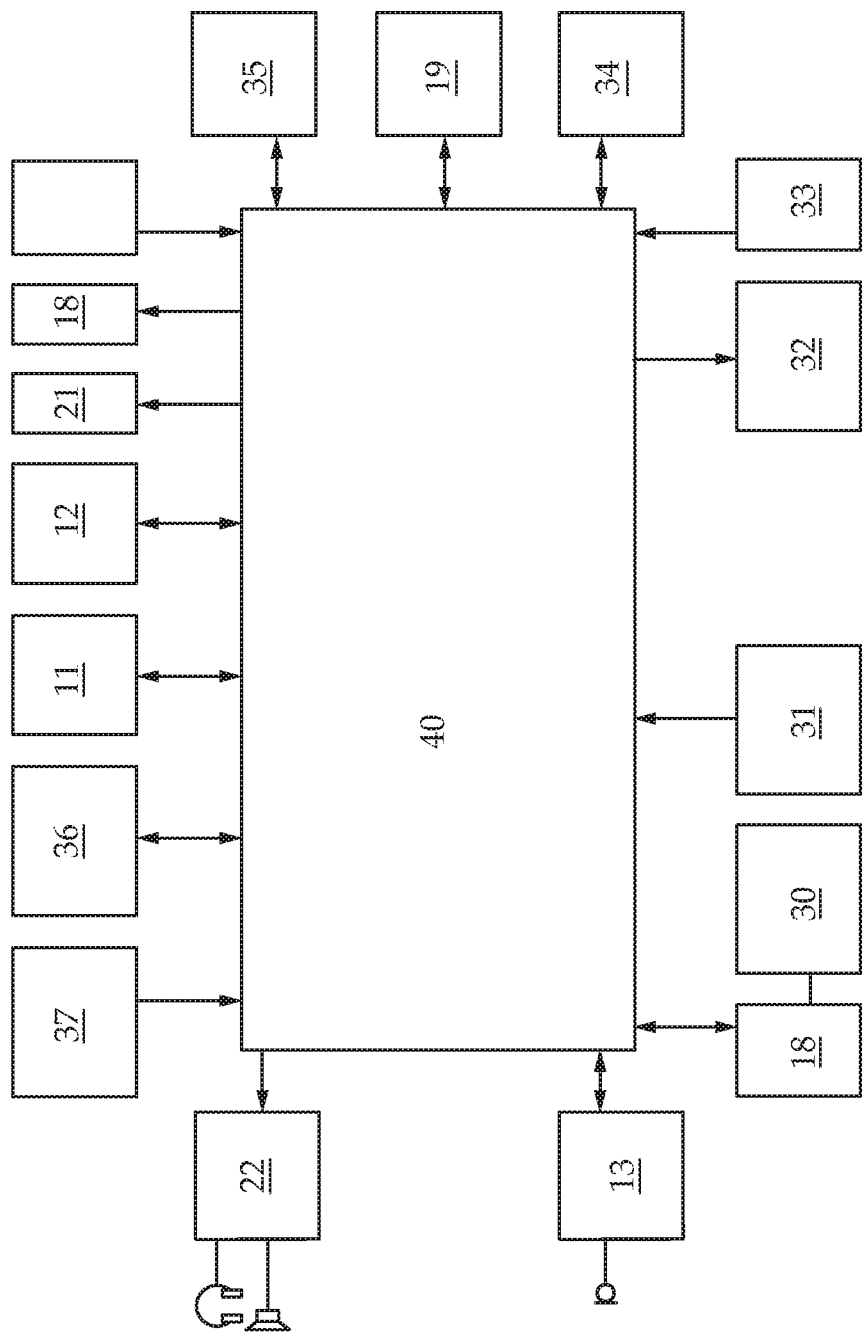
FIG. 3 provides a schematic view of an embodiment of the device contemplated herein.

FIG. 3 provides a schematic view of the modules of the device of the present invention. A processor 40 communicates and operates the various modules and components of the device 10 of the present invention. In communication with the processor are a number of various components, which may be included or excluded from different embodiments without straying from the scope of the present invention. In this embodiment, components such as the touch screen 11, camera 12, microphone 13, memory 19 (and memory/activity logger module 35), Wi-Fi (or other networked communications module) 34, and the input/output connection 18 have two way communication with the processor 40. A charger input 30 to provide electrical charge to a battery of the device enters through the input/output connection 18. Audio output 22, light 18 and 21 receive input instructions from the processor, as does vibrating indicator 32. An accelerometer 31 provides an input to the processor 40 to log acceleration by the device 10. The accelerometer 31 may input to the processor 40 upon receipt of an above-threshold acceleration, upon a query by the processor and/or automatically. In this view, an alarm sensor 33 such as a toxic gas sensor or the like provides an input to processor 40, again either upon receipt of an above-threshold reading, upon a query by the processor or automatically. A GPS or other location module 36 is, in this embodiment, in two way communication with the processor 40. The location module 37 may operate as discussed above to track a location of the device 10. Further, a GSM-GPRS or similar cellular communication system module 37 is in two way communication with the processor 40. In some embodiments, the cellular module 37 may operate as a location module as well.

Figure 4:
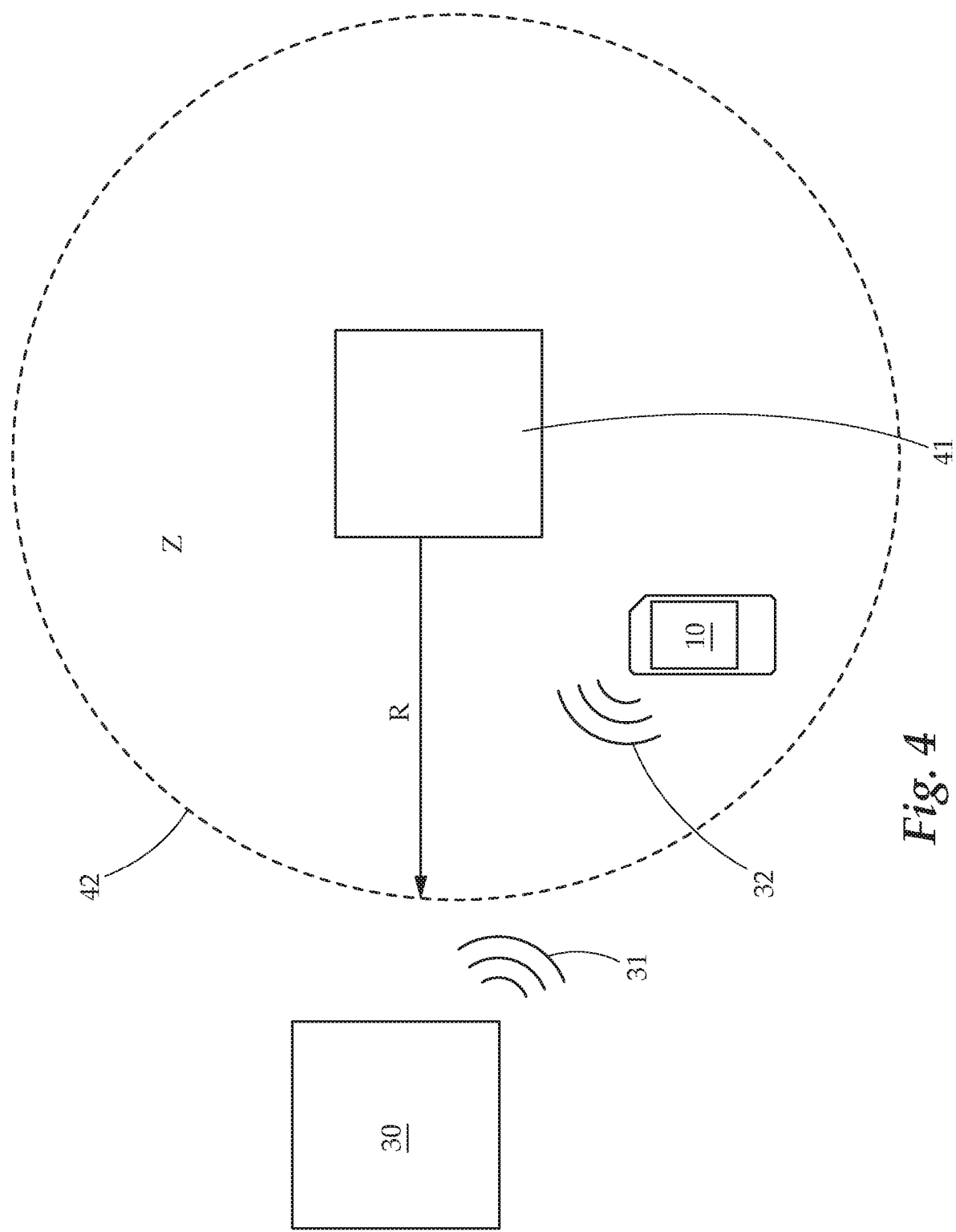
FIG. 4 provides a view of an embodiment of the present disclosure in use.

FIG. 4 provides a view of an embodiment of operation of the present invention. In this view, a worksite 41 is an area where one or more workers is at work and logging time at the worksite 41. A computerized hours-tracking device 10 is in wireless communication with server 30 via communications 31 and 32. This device 10 is in a zone Z around the worksite 41. This zone Z may be calculated by one or both of the server 30 and device 10. The zone Z is determined as an area that is a predetermined radius R or other distance away from the worksite 41. This zone Z may be automatically calculated or may be input by a user. In operation, the server 30 logs the location of the device 10. If the device 10 moves outside of the zone Z boundary 42, the server 30 and/or device 10 logs this. Movement outside of the boundary 42 may result in reduced time worked, or other recording as determined by the particular arrangements of the system, as discussed above.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:
1. A system for tracking hours of a worker comprising:
a computerized hours-tracking device comprising a processor, a memory, a location module configured to determine a physical location of the computerized hours-tracking device, a touch screen display, and a battery providing power to the device; and
a computerized server in wireless communication with the computerized hours-tracking device, the communication between the computerized server and computerized hours-tracking device comprising a recordation of the determined location of the computerized hours-tracking device by the computerized server, a start time input from the computerized hours-tracking device, and an end time input from the computerized hours-tracking device;
wherein the computerized server is configured to record the start time input from the computerized hours-tracking device;
wherein the computerized hours-tracking device is configured to confirm an identity of a user;
wherein the computerized server is configured to record the end time input from the computerized hours-tracking device;
wherein at least one of the computerized hours-tracking device and the server is configured to calculate a work time based on a time period between the start time and end time inputs;

wherein the computerized server is configured to record when the computerized hours-tracking device moves outside of a predetermined boundary around a worksite;

wherein the computerized server is further configured to automatically subtract an amount of time that the computerized hours-tracking device is outside of the predetermined boundary from the calculated work time to determine a modified work time; and wherein the computerized server is configured to calculate a payment amount for the user based on the modified work time.

2. The system of claim 1 wherein the computerized hours-tracking device further comprises a fingerprint scanner configured to confirm the identity of the user.

3. The system of claim 1 wherein the computerized hours-tracking device further comprises a facial identification scanner configured to confirm the identity of the user.

4. The system of claim 1 wherein the computerized hours-tracking device further comprises an iris scanner configured to confirm the identity of the user.

5. The system of claim 1 wherein the computerized hours-tracking device is configured to receive an input to confirm the identity of the user.

6. The system of claim 5 wherein the input is a code input.

7. The system of claim 1 wherein the computerized hours-tracking device further comprises a motion sensor configured to indicate a movement of the device.

8. The system of claim 1 wherein the computerized hours-tracking device is a smartphone.

9. The system of claim 1 wherein the computerized hours-tracking device further comprises a detector configured to detect a toxic gas.

10. The system of claim 1 wherein the computerized hours-tracking device further comprises at least one of an AM/FM radio, MP3 player, wireless speaker.

11. The system of claim 1 wherein the computerized hours-tracking device further comprises a communications module allowing the computerized hours-tracking device to be used for a personal communication of a user, the communications module comprising cellular telephone operability, direct communication with an employer, SMS messaging, and data communication.

12. The system of claim 1 wherein the computerized hours-tracking device further comprises a biometric sensor configured to monitor a status of the user, the biometric sensor being one of a pulse oximeter and a heart-rate sensor.

* * * * *